United States Patent
Mehlis et al.

(10) Patent No.: US 10,605,344 B2
(45) Date of Patent: Mar. 31, 2020

(54) GEAR SYSTEM FOR AN ELECTRIC MOTOR OF A VEHICLE, AND VEHICLE INCLUDING THE GEAR SYSTEM

(71) Applicant: Schaeffler Technologies AG & Co. KG, Herzogenaurach (DE)

(72) Inventors: Thomas Mehlis, Kleinsendelbach (DE); Andreas Kinigadner, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 60 days.

(21) Appl. No.: 15/541,415

(22) PCT Filed: Jan. 14, 2016

(86) PCT No.: PCT/DE2016/200013
§ 371 (c)(1),
(2) Date: Jul. 3, 2017

(87) PCT Pub. No.: WO2016/116103
PCT Pub. Date: Jul. 28, 2016

(65) Prior Publication Data
US 2018/0009314 A1 Jan. 11, 2018

(30) Foreign Application Priority Data
Jan. 20, 2015 (DE) .......... 10 2015 200 798

(51) Int. Cl.
*F16H 37/08* (2006.01)
*B60K 7/00* (2006.01)
(Continued)

(52) U.S. Cl.
CPC .......... *F16H 37/084* (2013.01); *B60K 1/00* (2013.01); *B60K 7/00* (2013.01); *F16H 37/021* (2013.01);
(Continued)

(58) Field of Classification Search
CPC ........ F16H 3/083; F16H 3/0915; F16H 3/097; F16H 37/021; F16H 37/0846;
(Continued)

(56) References Cited

U.S. PATENT DOCUMENTS

| 5,720,686 A | 2/1998 | Yan et al. |
| 5,931,760 A * | 8/1999 | Beim .................. F16H 37/0846 475/207 |

(Continued)

FOREIGN PATENT DOCUMENTS

| CN | 1568406 | 1/2005 |
| CN | 101228370 | 7/2008 |

(Continued)

OTHER PUBLICATIONS

International Search Report of PCT/DE2016/200013 dated Nov. 5, 2015, 2 pages.

*Primary Examiner* — David R Morris
(74) *Attorney, Agent, or Firm* — Davidson, Davidson & Kappel, LLC

(57) ABSTRACT

A gearing arrangement that offers a new way to operate an electric motor at a favorable operating point is provided. To this end there is proposed a gearing arrangement (1) for an electric motor (6) of a vehicle (2), including an input interface (5) for coupling to the electric motor (6) and including an output interface (7), such that a drive torque path runs between the input interface (5) and the output interface (7); including a first transmission gearing stage (10) with a first transmission ratio (i1), such that the drive torque path in a first operating state of the gear arrangement (1) runs via the first transmission gearing stage (10); and including a second transmission gearing stage (11), such that the drive torque path in a second operating state of the gear arrangement (1) runs via the second transmission gearing (Continued)

stage (11), the second transmission gearing stage (11) having a continuously variable transmission ratio (i1 . . . i2).

11 Claims, 2 Drawing Sheets

(51) Int. Cl.
    *F16H 3/083* (2006.01)
    *F16H 37/02* (2006.01)
    *B60K 1/00* (2006.01)
(52) U.S. Cl.
    CPC ............... *B60K 2001/001* (2013.01); *B60K 2007/0092* (2013.01); *F16H 3/083* (2013.01); *F16H 2200/0021* (2013.01)
(58) Field of Classification Search
    CPC ............ B60K 2001/001; B60K 7/0007; B60K 2007/0046; B60K 2007/0092
    See application file for complete search history.

(56) References Cited

U.S. PATENT DOCUMENTS

| | | | |
|---|---|---|---|
| 5,937,711 A | 8/1999 | McCarrick et al. | |
| 5,961,414 A * | 10/1999 | Beim | F16H 37/0846 475/207 |
| 7,559,868 B2 | 7/2009 | Rohs et al. | |
| 7,682,278 B2 | 3/2010 | Rohs et al. | |
| 7,717,815 B2 | 5/2010 | Tenberge | |
| 8,454,473 B2 | 6/2013 | Reitz | |
| 9,821,806 B2 * | 11/2017 | Shimazu | F16H 61/66259 |
| 2006/0270517 A1 * | 11/2006 | Rohs | F16H 15/42 475/312 |
| 2007/0004556 A1 * | 1/2007 | Rohs | F16H 15/42 477/130 |
| 2007/0021259 A1 * | 1/2007 | Tenberge | B60K 6/445 475/5 |
| 2009/0156354 A1 * | 6/2009 | Rohs | F16H 15/42 476/52 |
| 2009/0178500 A1 | 7/2009 | Walter | |
| 2009/0312137 A1 * | 12/2009 | Rohs | F16H 15/42 475/214 |
| 2012/0100957 A1 * | 4/2012 | Reitz | B60K 6/445 477/8 |
| 2017/0151949 A1 * | 6/2017 | Shimazu | F16H 61/66259 |
| 2018/0017148 A1 * | 1/2018 | Mehlis | B60K 1/00 |

FOREIGN PATENT DOCUMENTS

| | | | |
|---|---|---|---|
| CN | 201133458 | 10/2008 | |
| CN | 101903687 | 12/2010 | |
| DE | 818300 C | 10/1951 | |
| DE | 4207093 A1 | 4/1993 | |
| DE | 69902835 T2 | 1/2003 | |
| DE | 10 2010 024 147 A1 | 1/2011 | |
| DE | 102010024603 A1 * | 12/2011 | ........... F16H 3/0915 |
| EP | 0119935 A1 | 9/1984 | |
| FR | 1268226 A | 7/1961 | |
| JP | 2004176890 | 6/2004 | |
| JP | 2008164117 | 7/2008 | |

* cited by examiner

GEAR SYSTEM FOR AN ELECTRIC MOTOR OF A VEHICLE, AND VEHICLE INCLUDING THE GEAR SYSTEM

The present invention relates to a gear system for an electric motor of a vehicle, including an input interface for coupling to the electric motor, and an output interface, a torque path extending between the input interface and the output interface, and including a first transmission gear section having a first gear ratio, in a first operating state of the gear system the torque path extending across the first transmission gear section, and including a second transmission gear section, in a second operating state of the gear system the torque path extending across the second transmission gear section. Moreover, the present invention relates to a vehicle that includes this gear system.

BACKGROUND

During the operation of vehicles with electric motors, it appears to be possible in principle to bring the vehicle from a standstill to top speed without changing a gear ratio in the drive train. However, it has been found that in this case, the electric motor cannot be operated in an optimal operating point.

Therefore, it is already known to use, for example, a two-speed transmission in a drive train for an electric motor in a motor vehicle. A shift may be made between a first gear ratio for starting and driving at a low vehicle speed, for example, and a second gear ratio for faster driving, for example.

The publication DE 10 2010 024 147 A1 provides this type of two-speed transmission and a corresponding method for controlling the two-speed transmission. The two-speed transmission may transmit the drive torque of the electric motor to an output gearwheel, on the one hand with gear step-down via a planetary gear section, and on the other hand directly, without gear step-up. It is thus possible to operate the electric motor in an operating point that is adapted at least to the speed range.

SUMMARY OF THE INVENTION

It is an object of the present invention to provide a gear system that allows a further approach for operating an electric motor in a favorable operating point. The present invention provides a gear system, and a vehicle.

Within the scope of the present invention, a gear system is provided that is suitable and/or designed for an electric motor. The electric motor optionally forms a part of the gear system according to the present invention. The gear system is in particular suitable and/or designed for a vehicle. The vehicle is preferably implemented as a passenger vehicle, a truck, a bus, or some other mobile vehicle. The vehicle may be designed as an electric vehicle or as a hybrid vehicle. In particular, the gear system may form the drive train of the vehicle or an auxiliary drive train of the vehicle. The gear system is particularly preferably designed as an electric axle for driving two wheels of a shared axle of the vehicle. In particular, the gear system is designed for accelerating the vehicle to a speed greater than 50 km/h.

The gear system thus forms at least one gear section in the drive train of the vehicle, between the electric motor and the driven wheels. In particular, a differential unit which distributes the drive torque of the electric motor to two driven wheels of the shared axle or to two axles of the vehicle may be connected downstream from the gear system. The differential unit optionally forms an integral part of the gear system.

The gear system includes an input interface that is designed for coupling to the electric motor. In particular, the input interface is rotatably fixedly connected to the electric motor, in particular to a rotor of the electric motor. The input interface is optionally nondetachably connected to the rotor of the electric motor.

In addition, the gear system includes an output interface for outputting the implemented drive torque of the electric motor, and which is designed in particular for coupling to the differential unit.

A torque path for transmitting and optionally translating the drive torque from the electric motor via the input interface to the output interface extends between the input interface and the output interface. The torque path is switchable within the gear system as a function of an operating state of the gear system. The torque path is optionally closed in every operating state of the gear system. The torque path may preferably be switched only between various variants of torque paths which are all closed between the input interface and the output interface. In particular, it is provided that the input interface and the output interface are continuously and/or always operatively connected.

The gear system includes a first transmission gear section having a first gear ratio. In particular, the first transmission gear section has a first fixed and/or constant gear ratio. The magnitude of the first gear ratio is preferably not equal to one. The first gear ratio is selected in particular so that a higher speed at the input and/or at the input interface is translated into a lower speed at the output and/or at the output interface. In particular, the first transmission gear section forms what is commonly referred to as a step-down gear. It is provided that in a first operating state of the gear system, the torque path extends as a first torque path across the first transmission gear section.

The gear system also includes a second transmission gear section. The second transmission gear section preferably implements a gear ratio. The magnitude of the gear ratio is preferably not equal to one. The gear ratio is selected in particular so that a higher speed at the input and/or at the input interface is translated into a lower speed at the output and/or at the output interface. In a second operating state, preferably also referred to as the shift state, of the gear system, the torque path extends as a second torque path across the transmission gear section. In particular, the second transmission gear section forms what is commonly referred to as a step-down gear.

The gear system is designed in particular so that in the first operating state, the second transmission gear section with its implementation is outside the first torque path, and/or in the second operating state, the first transmission gear section having the first gear ratio is outside the second torque path.

The overall gear ratio of the gear system in the first operating state particularly preferably corresponds to the first gear ratio, and in the second operating state corresponds to the gear ratio of the second transmission gear section. In addition, a further transmission step, whose gear ratio in the first operating state as well as in the second operating state contributes to the overall gear ratio of the gear system, may optionally be implemented in the gear system.

Within the scope of the present invention, it is provided that the second transmission gear section has a continuously variable gear ratio. In particular, the gear ratio of the second transmission gear section is continuously variably and/or variably adjustable. According to the present invention, it is thus provided that the gear system is switchable between a first operating state having a fixed gear ratio and a second operating state having a continuously variable, variable, and/or adjustable gear ratio. With this gear architecture, it is possible to select a fixed gear ratio for speed and/or torque requirements, which is to be expected as standard. Such a fixed gear ratio typically has the advantage that the efficiency of the gear system is very high. In contrast, the second operating state may be used to variably adjust the gear system for a larger range of a speed and/or torque requirement. Although in comparison to the first operating state the efficiency is lower with respect to a fixed gear ratio, the operating point of the electric motor may be optimally set via the variable gear ratio, so that the low efficiency is at least partially compensated for. The gear system according to the present invention, as a hybrid gear, thus combines the advantages of a gear having a fixed gear ratio with the advantages of a gear having a continuously variable gear ratio. Overall, this allows a further approach for operating an electric motor in a situationally adapted, and thus favorable, operating point.

In one preferred embodiment of the present invention, it is provided that, in particular terms of absolute value, a minimum gear ratio of the second transmission gear section is designed to be less than the first gear ratio of the first transmission gear section. Alternatively or additionally, the first transmission gear section forms a low gear (also referred to as a speed), in particular a first gear, and the second transmission gear section forms a higher gear, in particular a second gear. This embodiment takes into account that a vehicle, for example during city driving, may be driven virtually in a constant gear ratio that is covered by the first transmission gear section, in particular as the first gear. The operating time in other driving states, for example long-distance driving or fast expressway driving, is more likely to be classified as short, so that the efficiency of the first transmission gear section is optimized by the fixed gear ratio, and in contrast the variability for other driving states is ensured by the second transmission gear section.

In addition, the shifting comfort of the gear system may be improved in that the transition from the fixed gear ratio of the first transmission gear section to the continuously variable gear ratio of the second transmission gear section takes place in a continuously variable manner. In particular, the second transmission gear section is designed in such a way that a starting gear ratio of the second transmission gear section corresponds to the first fixed gear ratio of the first transmission gear section, or at least covers same. It is thus possible to switch the torque path from the first transmission gear section to the second transmission gear section, the transition taking place in a continuously variable manner due to the matching of the gear ratios. As a result of the starting gear ratio of the second transmission gear section and the first gear ratio being equal, the shifting may also take place under load. In particular, shifting that is free of interruptions in traction may thus be achieved.

In particular, in an intermediate switching state it is possible for the torque path to be divided, and to extend across the first transmission gear section and also across the second transmission gear section. When the gear ratio further changes in the direction of a smaller (in terms of absolute value) gear ratio, this may take place in a continuously variable manner by controlling the second transmission gear section, the second operating state being reached no later than when the adjusted gear ratio of the second transmission gear section is less than the fixed gear ratio of the first transmission gear section.

The shifting comfort of the gear system is thus comparable to that of a CVT. Overall, starting in the low gear, in particular in the first gear, a constant, controllable drive torque may be transmitted to the vehicle wheels, and in particular shifting and driving may take place without interruptions in traction. Likewise, during fast expressway driving the electric motor may be operated in the optimal, or at least optimized, operating point.

The first transmission gear section is preferably designed as a gear stage, in particular a spur gear stage. In the simplest design, the gear stage may have a two-wheeled design. With regard to the second transmission gear section, which in the simplest embodiment uses a positive gear ratio (I>0), it is preferred that the gear stage has an uneven number of wheels, in particular three wheels, in order to likewise achieve a positive gear ratio (I>0).

In one preferred implementation of the present invention, the second transmission gear section is designed as a continuously variable transmission (CVT) section. The second transmission gear section, in particular the CVT section, is particularly preferably implemented as a traction mechanism gear section. The traction mechanism may be designed, for example, as a steel thrust belt, as a V-belt, as a plate link chain, as a chain, etc. In one preferred refinement of the present invention, the second transmission gear section is designed as a variator.

Alternatively or additionally, the second transmission gear section includes a pair of input cone pulleys, a pair of output cone pulleys, and a traction mechanism, the traction mechanism being situated operatively connected between the two pairs. The gear ratio of the second transmission gear section may be adjusted in a continuously variable manner by changing the axial distance between the output cone pulleys and between the input cone pulleys.

In one preferred refinement of the present invention, the gear system includes at least one or exactly one actuator device for displacing one of the input cone pulleys, as a displaceable input cone pulley, in at least one axial direction. In addition, the gear system includes a coupling input wheel of the first transmission gear section, a coupling between the coupling input wheel and the displaceable input cone pulley taking place via an axial movement of the displaceable input cone pulley. As the result of axially moving the displaceable input cone pulley, on the one hand it is coupled to the coupling input wheel, and on the other hand the axial distance between the displaceable input cone pulley and the other input cone pulley, which is preferably designed as a stationary input cone pulley, is increased in the coupled state compared to the uncoupled state.

If the pair of input cone pulleys is regarded as a wheel for the traction mechanism, increasing the axial distance decreases the pitch diameter of the wheel, also referred to as the effective pitch diameter. In the first operating state, the displaceable input cone pulley is in a coupled state with the coupling input wheel. In the second operating state, the displaceable input cone pulley and the coupling input wheel are in an uncoupled state.

As a result of the actuator device, on the one hand the switching of the operating states is achieved by a coupling or decoupling of the input cone pulley and the coupling input wheel. On the other hand, the continuously variable gear ratio may be adjusted by changing the axial distance between the input cone pulleys.

The axial distance between the output cone pulleys is automatically set to match the axial distance between the input cone pulleys. At least one or even both of the output cone pulleys may optionally be appropriately passively pretensioned, for example by spring devices, or synchronously moved by a further actuator device.

It is to be noted in particular that the switching of the operating states and the adjustment of the continuously variable gear ratio take place via the actuator device. Thus, only one actuator device is needed for the gear system. It is preferably provided that the actuator device in the first operating state may be set in a de-energized state in order to minimize the energy requirements of the actuator device, and thus of the gear system.

In one possible structural embodiment, the coupling between the coupling input wheel and the displaceable input cone pulley takes place via a form-locked clutch, in particular a claw clutch. Use of the form-locked clutch, in particular the claw clutch, is possible in particular due to the fact that during the change of the operating state, the continuously variable gear ratio is set to the same value as the first fixed gear ratio of the first transmission gear section.

In one preferred refinement of the present invention, the gear system includes a differential unit, the differential unit being operatively connected to the output interface. In principle, it is possible for the differential unit to be, for example, situated axially parallel to the electric motor, to the first transmission gear section, and/or to the second transmission gear section. However, the differential unit is particularly preferably situated coaxially with respect to the input interface. In this embodiment, the input interface has a hollow shaft section, an output shaft of the differential assembly being passed through the hollow shaft section. In this embodiment, it is thus possible to situate the differential unit coaxially with respect to the input interface, and thus coaxially with respect to the pair of input cone pulleys.

In one preferred refinement of the present invention, the gear system includes the electric motor, the electric motor being situated coaxially with respect to the hollow shaft section, and the output shaft additionally being passed through the electric motor. The gear system may thus be designed as a coaxial assembly that is situated coaxially with respect to the output shaft(s) of the differential unit.

In one preferred structural implementation of the present invention, the gear system includes an input shaft and an output shaft. The input shaft is operatively connected, in particular rotatably fixedly connected, to the input interface, and the output shaft is operatively connected, in particular rotatably fixedly connected, to the output interface. The first transmission gear section includes a first fixed wheel on the output shaft and a first idler wheel on the input shaft. The actuator device is designed for coupling and decoupling the displaceable input cone pulley to/from the first idler wheel as a coupling input wheel.

In one preferred refinement of the present invention, in the first operating state the torque path extends from the input interface via the input shaft, via the displaceable cone pulley, across the first transmission gear section, and outside the second transmission gear section via the output shaft to the output interface. In contrast, in the second operating state the torque path extends from the input interface via the input shaft, via at least one of the input cone pulleys, across the second transmission gear section, in particular via the traction mechanism and/or outside the first transmission gear section, via the output shaft to the output interface. It is particularly preferred for the first torque path to be designed as a solely form-locked torque path, and/or for the second torque path to be designed as a frictionally locked torque path, at least in sections.

The vehicle constitutes a further subject matter of the present invention. The vehicle includes the gear system. In addition, the vehicle includes the electric motor. The vehicle may additionally include an internal combustion engine as a further drive torque generator. The gear system is particularly preferably implemented as an electric front axle or as an electric rear axle.

BRIEF DESCRIPTION OF THE DRAWINGS

Further features, advantages, and effects of the present invention result from the following description of one preferred exemplary embodiment of the present invention, and the appended figures.

DETAILED DESCRIPTION

Figure 1:
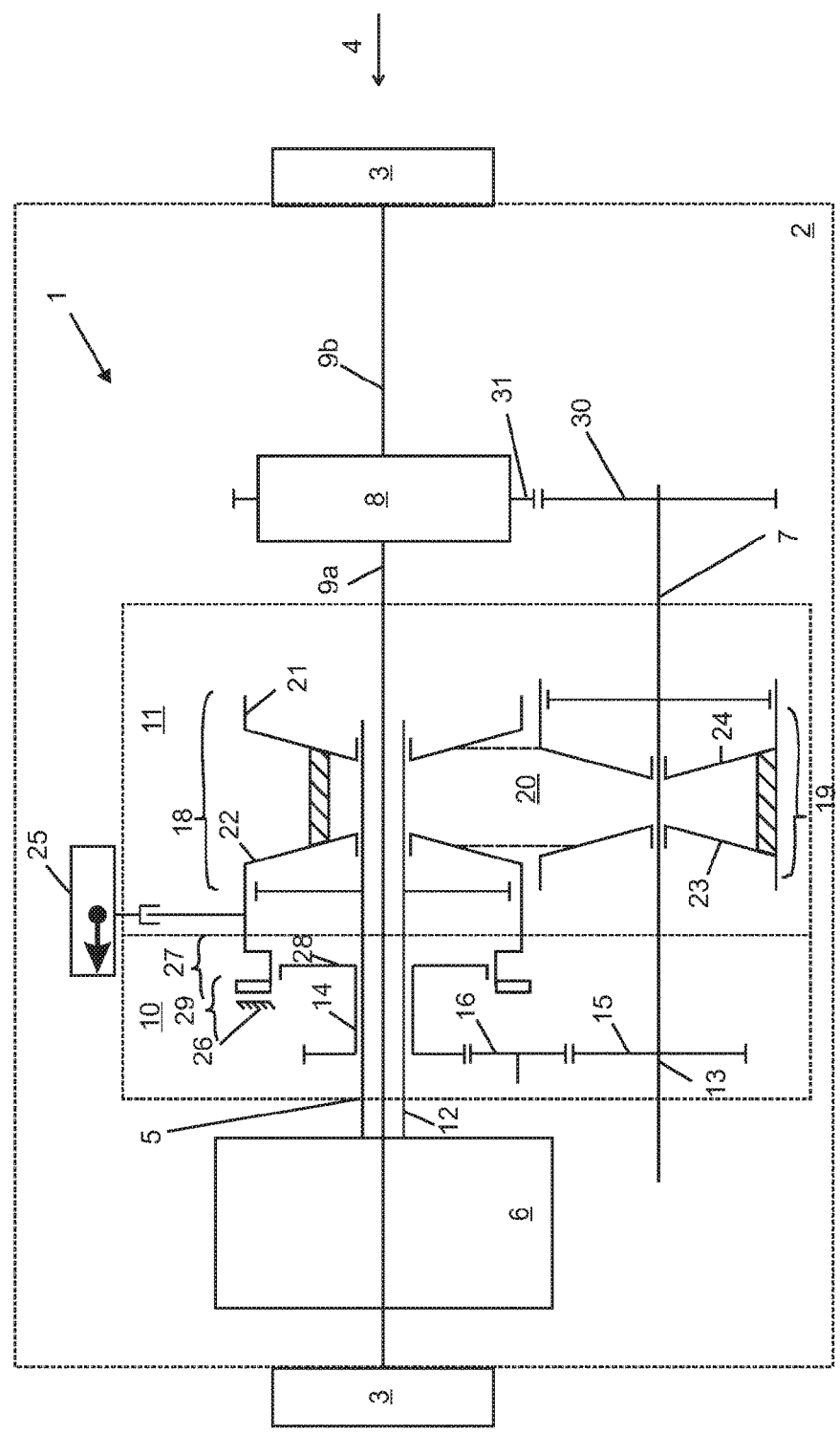
FIG. 1 shows a schematic illustration of a gear system as one exemplary embodiment of the present invention, in a first operating state.

FIG. 1 shows a schematic illustration of a gear system 1 for a vehicle 2, vehicle 2 being depicted only schematically as a box. Gear system 1 forms a part of the drive train of vehicle 2 or forms the drive train of vehicle 2. Vehicle 2 may be designed as a strictly electric vehicle, or alternatively, vehicle 2 is designed as a hybrid vehicle. In the exemplary embodiment shown, gear system 1 is used for driving wheels 3 of a driven axle 4 of vehicle 2.

Gear system 1 includes an input interface 5, and an electric motor 6 that is rotatably fixedly coupled to input interface 3. Electric motor 6 is designed as a traction motor for vehicle 2, and on the one hand may constitute the sole traction motor for vehicle 2. Alternatively, vehicle 2 may be designed as a hybrid vehicle, which in addition to electric motor 6 includes yet another motor as a traction motor for the drive. It is also possible for vehicle 2, as an electric vehicle, to include one or multiple additional electric motors as traction motors.

Gear system 1 also includes an output interface 7 that is in operative connection with a differential unit 8. Differential unit 8 is used for distributing the drive torque, which is generated by electric motor 6 and transmitted by gear system 1 and optionally converted, to the two wheels 3 of axle 4. Differential unit 8 includes two output shafts 9a, 9b which transmit the drive torque from differential unit 8 in the direction of wheels 3. In another embodiment of the present invention, differential unit 8 may also be used for distributing the drive torque to two axles of the vehicle. In the former case, differential unit 8 is designed as a transverse differential unit, and in the latter case, as a longitudinal differential unit. Differential unit 8 and/or output shafts 9a, 9b optionally form(s) an integral part of gear system 1.

Gear system 1 may be subdivided into a first transmission gear section 10 and a second transmission gear section 11, which are activated or deactivated as a function of an operating state of gear system 1.

Gear system 1 includes an input shaft 12 and an output shaft 13. Input shaft 12 is rotatably fixedly coupled, in particular connected, to input interface 5, and output shaft 13 is rotatably fixedly coupled, in particular connected, to output interface 7. Input shaft 12 and output shaft 13 are offset in parallel to one another.

First transmission gear section 10 is designed as a gear stage, and includes a first idler wheel 14 that is rotatably situated on input shaft 12. In addition, first transmission gear section 10 includes a first fixed wheel 15 that is rotatably fixedly situated on output shaft 13. First idler wheel 14 and first fixed wheel 15 are operatively connected to one another via a first intermediate wheel 16. First idler wheel 14, first fixed wheel 15, and first intermediate wheel 16 are each designed as spur gears, in particular spur gearwheels, and together form a gear stage having a first fixed gear ratio i1.

Second transmission gear section 11 includes a pair of input cone pulleys 18 and a pair of output cone pulleys 19, as well as a traction mechanism 20. The pair of input cone pulleys 18 is coaxially and rotatably fixedly mounted on input shaft 12. The pair of output cone pulleys 19 is coaxially and rotatably fixedly mounted on output shaft 13. Traction mechanism 20 is designed as a wraparound means, and transmits the drive torque from the pair of input cone pulleys 18 to the pair of output cone pulleys 19, and thus from input shaft 12 to output shaft 13. The traction mechanism may be designed, for example, as a steel thrust belt, a V-belt, a plate link chain, or a chain.

The pair of input cone pulleys 18 includes a stationary input cone pulley 21 and an axially displaceable input cone pulley 22. The pair of output cone pulleys 19 includes a stationary output cone pulley 23, and an output cone pulley 24 that is displaceable in the axial direction. The pair of input cone pulleys 18 face one another, traction mechanism 20 being guided between input cone pulleys 21 and 22 on their mutually facing tapered surfaces. In addition, traction mechanism 20 extends between mutually facing output cone pulleys 23 and 24, traction mechanism 20 being guided on their mutually facing tapered surfaces.

The pair of input cone pulleys 18, the pair of output cone pulleys 19, and traction mechanism 20 together form a variator gear having a continuously variable gear ratio, the continuously variable gear ratio covering at least the range between i1 and i2, so that the gear ratio range between i1 and i2 may be provided from second transmission gear section 11 in a continuously variable manner. Gear ratio i2 is smaller than gear ratio i1.

In the following description, the instantaneous radial position of traction mechanism 20 in the pair of input cone pulleys 18 is used as their effective pitch diameter, and the instantaneous radial position of traction mechanism 20 in the pair of output cone pulleys 19 is used as their effective pitch diameter.

Gear system 1 includes an actuator device 25 that is designed for detachably coupling axially displaceable input cone pulley 22 to first idler wheel 14. Actuator device 25 is designed as an electrical actuator, and allows active displacement of displaceable input cone pulley 22 in the axial direction. A return of displaceable input cone pulley 22 in the opposite direction may selectively take place, likewise via actuator device 25 or via a spring device, not illustrated. Actuator device 25 has a self-locking design, so that in the particular selected axial position it also remains in the de-energized state and thus saves energy.

Actuator device 25 actuates a first clutch device 27, which detachably couples input cone pulley 22 to first idler wheel 14 via a coupling input wheel 28. Coupling input wheel 28 is rotatably fixedly connected to first idler wheel 14 or forms a part of same. In this example, first idler wheel 14 and coupling input wheel 28 are designed as a double wheel. In this exemplary embodiment, coupling input wheel 28 and displaceable input cone pulley 22 each bear a claw part, and the two claw parts together form a claw clutch as first clutch device 27. The claw part may rest directly on or at idler wheel 14 instead of on coupling input wheel 28.

Clutch device 27 is closed when actuator device 25 axially moves displaceable input cone pulley 22 in the direction of first idler wheel 14, so that the claw part of displaceable input cone pulley 22 may engage with the claw part of coupling input wheel 28 in a form-locked manner. First clutch device 27 is disengaged when displaceable input cone pulley 22 is moved away from first idler wheel 14 in the axial direction.

An output wheel 30 as a fixed wheel is mounted on output shaft 13 at output interface 7, and meshes with an input wheel 31 of differential unit 8. Output wheel 30 and input wheel 31 may form a further, constant gear stage. Differential unit 8 and input shaft 12 are coaxial with respect to one another. In particular, input shaft 12 is designed as a hollow shaft, output shaft 9a being coaxially passed through the hollow shaft. In particular, input shaft 12 is rotatably fixedly connected to a rotor (not illustrated) of electric motor 6. Output shaft 9a is also passed through the rotor of electric motor 6. In this way, gear system 1 may be situated coaxially with respect to axle 4 of vehicle 2.

Gear System 1 Functions as Follows:

Gear system 1 is illustrated in a first operating state in FIG. 1. In the first operating state, actuator device 25 is illustrated in a coupled state, displaceable input cone pulley 22 being rotatably fixedly coupled to first idler wheel 14 via coupling input wheel 28. This is implemented in that the claw part of displaceable input cone pulley 22 and the claw part of coupling input wheel 28 are in form-locked engagement with one another.

A torque path, provided as a first torque path, extends, starting from electric motor 6, input interface 5, via input shaft 12, displaceable input cone pulley 22, coupling input wheel 28, idler wheel 14, first intermediate wheel 16, first fixed wheel 15, and output shaft 13 to output interface 7, and then via output wheel 30 to input wheel 31 into differential unit 8, and from there the drive torque is distributed on the two output shafts 9a, 9b.

In the first operating state, the drive torque is thus transmitted across first transmission gear section 10, and gear system 1 provides first fixed gear ratio i1 between input interface 5 and output interface 7.

Figure 2:
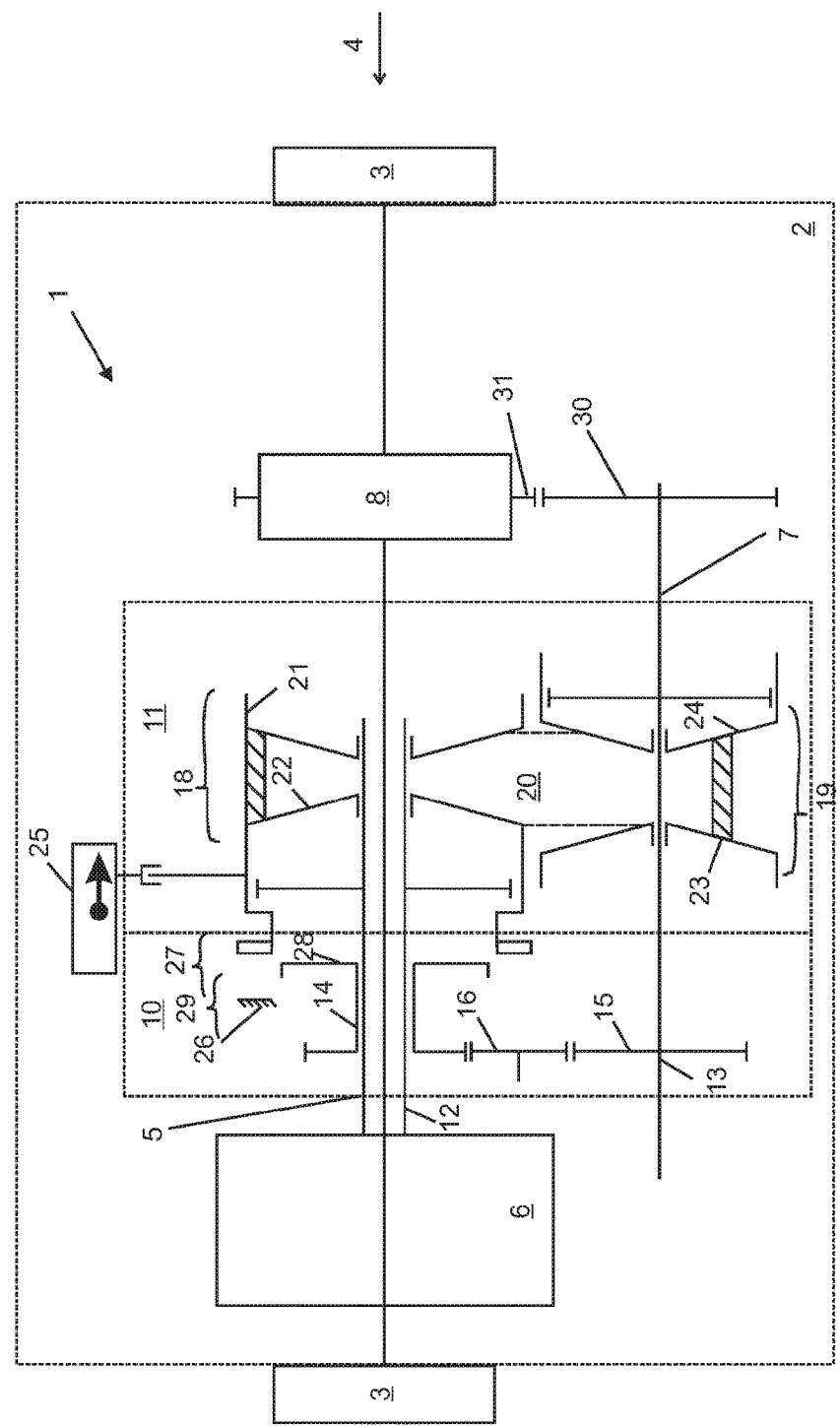
FIG. 2 shows the gear system in FIG. 1 in a second operating state.

Gear system 1 is illustrated in a second operating state in FIG. 2. In the second operating state, first actuator device 25 is in an uncoupled state, displaceable input cone pulley 22 being decoupled from first idler wheel 14.

A torque path, provided as a second torque path, extends, starting from electric motor 6, input interface 5, input shaft 12, the pair of input cone pulleys 18, traction mechanism 20, the pair of output cone pulleys 19, and output shaft 13 to output interface 7, and from there via output wheel 30 and input wheel 31 to differential unit 8, which distributes the drive torque to the two output shafts 9a, 9b. In the second operating state, the drive torque is thus transmitted via second transmission gear section 11, and gear system 1 provides a variable or continuously variable gear ratio with gear ratio values between it and i2.

During the switching between the first operating state and the second operating state, the continuously variable gear ratio of second transmission gear section 11 is set in such a way that it corresponds exactly to fixed gear ratio i1 of first transmission gear section 10. Shifting between the first operating state and the second operating state may thus be implemented, free of interruptions in traction.

Fixed gear ratio i1 of first transmission gear section 10 is greater than possible minimum gear ratio i2 of second transmission gear section 11. First transmission gear section 10 thus forms a first speed or a first gear, and second transmission gear section 11 forms a second speed or a second gear, of gear system 1. It should be additionally noted that in the first operating state, all, or at least over 50 percent, preferably at least over 80 percent, of the drive torque is transmitted via first intermediate wheel 16. In the second operating state, all of the drive torque is transmitted via traction mechanism 20, whereas no drive torque is transmitted via first intermediate wheel 16.

Gear system 1 has the advantage that for standard driving situations of vehicle 2, first transmission gear section 10 may be used, which has a high efficiency due to fixed gear ratio i1. In particular, first transmission gear section 10 or first fixed gear ratio i1 may be coordinated in such a way that vehicle 2 may be operated up to a speed of 50 km/h or 60 km/h. In particular, the first torque path across first transmission gear section 10 is used for city driving. In contrast, it is provided that the second torque path across second transmission gear section 11 is designed for faster driving, in particular for long-distance driving at speeds greater than 80 km/h, or for expressway driving at speeds greater than 130 km/h.

The distribution between the fixed gear and the variable gear is selected in such a way that, based on an operating time of vehicle 2, a majority of the operating time is driven in first transmission gear section 10, and transmission gear section 11 is used only in less common driving situations. Although transmission gear section 11 has a lower efficiency, due to the gear ratio which is adjustable in a continuously variable manner it is possible on the one hand to operate electric motor 6 at an optimal or at least optimized operating point, so that the poorer efficiency is at least partially compensated for. On the other hand, the gear ratio which is adjustable in a continuously variable manner allows vehicle 2 to be set to any desired driving situation.

Downshifting from the second operating state into the first shift state is implemented in that actuator device 25 axially moves displaceable input cone pulley 22 in the direction of first idler wheel 14. The axial distance between the pair of input cone pulleys 18 is thus increased. The gear ratio is subsequently led from i2 to i1, and lastly, clutch device 27 is transferred from the uncoupled state to the coupled state.

Gear system 1 optionally includes a blocking device 29 that is formed by a stop 26 and displaceable input cone pulley 22. Stop 26 is fixed to the housing and/or to the frame. Displaceable input cone pulley 22 and stop 26 are designed for a frictionally locked and/or form-locked coupling. Blocking device 29 is activated or locked in that actuator device 25 moves displaceable input cone pulley 22 from stationary input cone pulley 21 across the shift position for first transmission gear section 10 into a blocked position. Displaceable input cone pulley 22 is moved in the axial direction against stop 26, and is connected to same in a form-locked and/or frictionally locked manner around input shaft 12 in the circumferential direction. To release blocking device 29, displaceable input cone pulley 22 is moved, for example, into the shift position for first transmission gear section 10. The actuation of blocking device 29 is thus carried out by the same actuator device 25.

LIST OF REFERENCE NUMERALS 1 gear system
2 vehicle
3 wheels
4 axle
5 input interface
6 electric motor
7 output interface
8 differential unit
9a, 9b output shafts
10 first transmission gear section
11 second transmission gear section
12 input shaft
13 output shaft
14 first idler wheel
15 first fixed wheel
16 first intermediate wheel
17 (unassigned)
18 input cone pulleys
19 output cone pulleys
20 traction mechanism
21 input cone pulley
22 input cone pulley
23 output cone pulley
24 output cone pulley
25 actuator device
26 stop
27 first clutch device
28 coupling input wheel
29 blocking device
30 output wheel
31 input wheel
i1 first fixed gear ratio
i2 gear ratio

The invention claimed is:

1. A gear system for an electric motor of a vehicle, the gear system comprising:
an input interface for coupling to the electric motor;
an output interface, a torque path extending between the input interface and the output interface;
a first transmission gear section having a first gear ratio, in a first operating state of the gear system the torque path extending across the first transmission gear section;
a second transmission gear section, in a second operating state of the gear system the torque path extending across the second transmission gear section, the second transmission gear section having a continuously variable gear ratio; and
an actuator configured to, in a first range of motion, engage the first transmission gear section and, in a second range of motion, vary the gear ratio of the second transmission gear section.

2. The gear system as recited in claim 1 wherein a minimum gear ratio of the second transmission gear section is less than the first gear ratio of the first transmission gear section, or the first transmission gear section forms a low gear and the second transmission gear section forms a higher gear.

3. The gear system as recited in claim 1 wherein the second transmission gear section is designed as a CVT section or a traction mechanism gear section or as a variator.

4. The gear system as recited in claim 1 wherein the second transmission gear section includes a pair of input cone pulleys, a pair of output cone pulleys, and a traction mechanism, the traction mechanism being situated operatively connected between the pairs of input and output cone pulleys.

5. The gear system as recited in claim 4 wherein the actuator is configured for displacing one of the input cone pulleys, as a displaceable input cone pulley, in at least one axial direction, and a coupling input wheel of the first transmission gear section, a coupling between the coupling in put wheel and the displaceable input cone pulley taking place via an axial movement of the displaceable input cone pulley, an axial distance between the displaceable input cone pulley and the other input cone pulley being greater in a coupled state than in an uncoupled state.

6. The gear system as recited in claim 5 further comprising an input shaft and an output shaft, the input shaft being operatively connected to the input interface and the output shaft being operatively connected to the output interface, the first transmission gear section including a first fixed wheel on the output shaft and a first idler wheel on the input shaft, the actuator being designed for coupling and decoupling the displaceable input cone pulley to and from the first idler wheel as, or via, the coupling input wheel.

7. The gear system as recited in claim 6 wherein in the first operating state, the torque path extends from the input interface via the input shaft, via the displaceable input cone pulley, across the first transmission gear section, and outside the second transmission gear section via the output shaft to the output interface, or in the second operating state, the torque path extends from the input interface via the input shaft, via at least one of the input cone pulleys, across the second transmission gear section, and outside the first transmission gear section via the output shaft to the output interface.

8. The gear system as recited in claim 1 further comprising a differential unit, the differential unit being operatively connected to the output interface, the differential unit being situated coaxially with respect to the input interface, the input interface being designed as a hollow shaft section, and the differential unit including an output shaft passed through the hollow shaft section.

9. The gear system as recited in claim 8 wherein the gear system includes the electric motor, the electric motor being situated coaxially with respect to the hollow shaft section, and the output shaft being passed through the electric motor.

10. A vehicle comprising the gear system as recited in claim 1.

11. A gear system for an electric motor of a vehicle, the gear system comprising:
   an input interface for coupling to the electric motor;
   an output interface, a torque path extending between the input interface and the output interface;
   a first transmission gear section having a first gear ratio, in a first operating state of the gear system the torque path extending across the first transmission gear section;
   a second transmission gear section, in a second operating state of the gear system the torque path extending across the second transmission gear section, the second transmission gear section having a continuously variable gear ratio, wherein the second transmission gear section includes a pair of input cone pulleys, a pair of output cone pulleys, and a traction mechanism, the traction mechanism being situated operatively connected between the pairs of input and output cone pulleys; and
   an actuator for displacing one of the input cone pulleys, as a displaceable input cone pulley, in at least one axial direction, and a coupling input wheel of the first transmission gear section, a coupling between the coupling input wheel and the displaceable input cone pulley taking place via an axial movement of the displaceable input cone pulley, an axial distance between the displaceable input cone pulley and the other input cone pulley being greater in a coupled state than in an uncoupled state.

\* \* \* \* \*